*Clare & Quigly,*
*Wood Auger.*
№ 19,829. Patented Apr. 6, 1858.
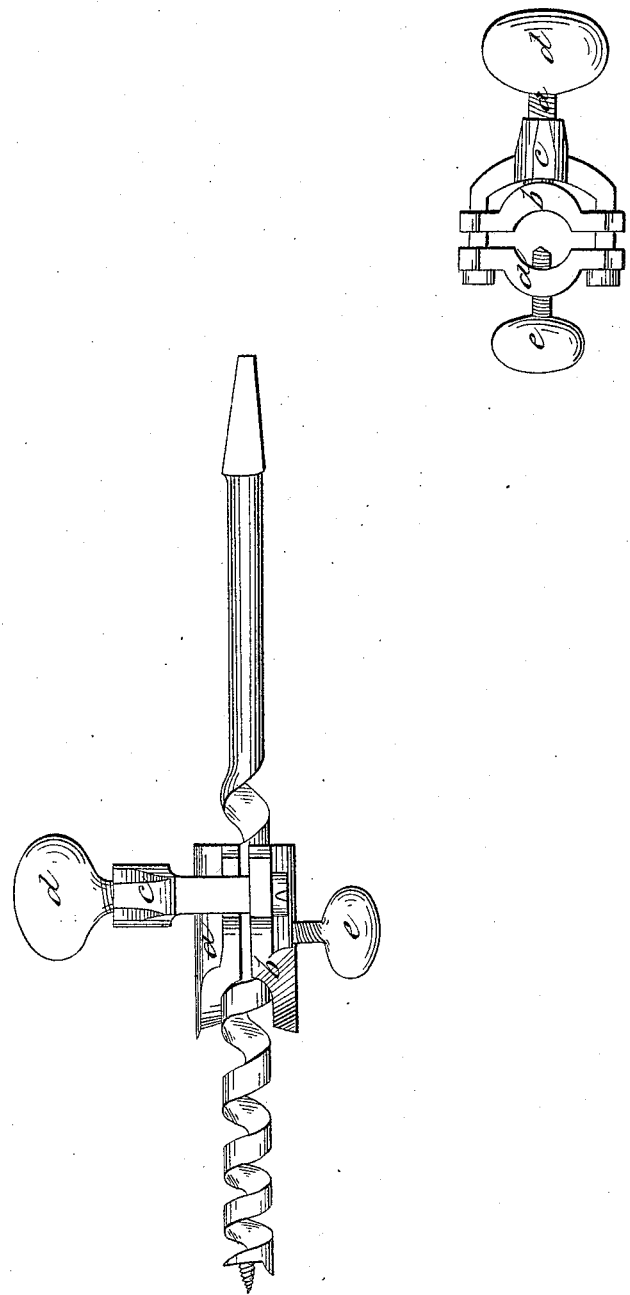

UNITED STATES PATENT OFFICE.

N. CLARE AND J. QUIGLEY, OF MALDEN, MASSACHUSETTS.

METHOD OF ATTACHING EXPANSIBLE CUTTING-TIPS TO AUGERS, &c.

Specification of Letters Patent No. 19,829, dated April 6, 1858.

*To all whom it may concern:*

Be it known that we, NICHOLAS CLARE and JOHN QUIGLEY, of Malden, in the county of Ulster, State of New York, have invented an Improved Detachable and Adjustable Reamer and Plug-Cutter; and we do hereby declare that the following is a full and exact description thereof, reference being had to the accompanying drawings and to the letters of reference marked thereon, of which the same letters in each of the figures indicate like parts.

Our invention consists in a reamer and plug-cutter so constructed that it may readily be attached to or detached from the auger or other boring or drilling tool, and so adjusted upon the same as to commence reaming or cutting at the desired distance from the cutting end of the tool and cut or ream the plug-hole or countersink of the desired diameter.

On reference to the drawings it will be perceived that the reamer or plug-cutter is of two pieces (*a*) and (*b*) each having a cutting edge or point, these two pieces being connected to each other by a yoke or divided bar (*c*) each fork or end of the bar being attached by a screw-nut to one of the pieces of the reamer while the other piece is embraced by the yoke. Lugs upon the one piece of it allow that piece to be moved in or out by a set-screw (*d*) passing through the body of the yoke. Another screw (*e*), it will be noticed, passes through the other half-piece of the reamer, which screw is both a set and binding screw, as it serves to fix the reamer to the auger or cutting or drilling tool, and, also, to set it away from the tool, increasing or diminishing the diameter of the reamer.

The drawings show this invention applied to an ordinary ship-carpenter's auger to be operated as a plug-cutter, and it will readily be seen that when thus used the plug-cutter will commence its operation at any given point from the point of the auger and cut the hole of such diameter as it has been set to and as is desirable. It will also, readily be perceived that the invention is applicable to any wood-boring or metal-drilling tool, it being necessary only to form the reamer or plug-borer and to give it such cutting edges and points as will adapt it to the hole or countersink desired.

The labor saving qualities of our invention are evident, as by its use but one tool is needed and but one movement necessary to perform both the reaming or plug-cutting and boring or drilling, as the case may be.

Having thus described our invention what we claim as new and desire to secure by Letters Patent is—

The detachable and adjustable reamer or plug-borer constructed and capable of being operated as herein set forth.

Dated 11th March, 1858.

NICHOLAS CLARE.
    JOHN QUIGLEY.

Witnesses:
 MATTHEW OSTERHANDT,
 JOHN D. GLENNON.